United States Patent [19]

Stoka

[11] Patent Number: 4,488,622
[45] Date of Patent: Dec. 18, 1984

[54] SPOT-TYPE FLOATING-CALIPER DISC BRAKE

[75] Inventor: Roberto Stoka, Nauheim, Fed. Rep. of Germany

[73] Assignee: ITT Industries, Inc., New York, N.Y.

[21] Appl. No.: 352,408

[22] Filed: Feb. 26, 1982

[30] Foreign Application Priority Data

Jun. 2, 1981 [DE] Fed. Rep. of Germany ....... 3121893

[51] Int. Cl.³ ................... F16D 55/224; F16D 65/72
[52] U.S. Cl. ............................. 188/72.3; 188/73.45; 188/216; 188/370
[58] Field of Search ............... 188/73.44, 73.45, 370, 188/72.3, 369, 368, 264 B, 216, 205 R, 71.1, 72.4, 72.5, 72.6, 73.32, 73.33, 73.34, 73.35, 73.39, 73.43, 71.8, 196 A

[56] References Cited

U.S. PATENT DOCUMENTS

| | | | |
|---|---|---|---|
| 3,376,955 | 4/1968 | Kamps et al. | 188/72.4 |
| 3,421,604 | 1/1969 | Hobbs | 188/72.5 |
| 3,688,876 | 9/1972 | Hirai et al. | 188/73.45 |
| 3,976,169 | 8/1976 | Ogawa | 188/73.44 X |
| 4,053,030 | 10/1977 | Bainard et al. | 188/216 X |
| 4,074,795 | 2/1978 | Kondo et al. | 188/73.45 X |
| 4,084,665 | 4/1978 | Burnett | 188/73.45 |
| 4,090,590 | 5/1978 | Karasudani et al. | 188/72.5 |
| 4,222,463 | 9/1980 | Domes et al. | 188/72.3 |
| 4,257,496 | 3/1981 | Fujita et al. | 188/72.6 |
| 4,265,340 | 5/1981 | Scott et al. | 188/73.44 |

FOREIGN PATENT DOCUMENTS

| | | | |
|---|---|---|---|
| 2840374 | 3/1980 | Fed. Rep. of Germany | |
| 2026635 | 2/1980 | United Kingdom | |
| 2099524 | 12/1982 | United Kingdom | 188/72.3 |

Primary Examiner—Douglas C. Butler
Attorney, Agent, or Firm—James B. Raden; Edward J. Brosius

[57] ABSTRACT

The spot-type floating-caliper disc brake includes at least one guide bolt secured to the brake support member and extending from the support member into an axial bore of the floating caliper adjacent the side of the brake cylinder. A roll-back sealing ring is provided at both ends of the axial bore, one disposed in an annular groove of the floating caliper and the other disposed in an annular groove of the guide bolt. As a result, a pressure chamber is formed around the guide bolt which communicates with the hydraulic brake circuit. With this arrangement, the brake shoe that is connected directly to the floating caliper will be reset to the nominal brake clearance after a braking operation.

7 Claims, 2 Drawing Figures

SPOT-TYPE FLOATING-CALIPER DISC BRAKE

BACKGROUND OF THE INVENTION

The present invention relates to a spot-type floating-caliper disc brake with at least one guide bolt secured to the brake support member and extending from the brake support member into an axial bore of the brake caliper provided at the side of the brake cylinder, with means being arranged at the guide bolt to restore the floating caliper after a braking action.

In a known spot-type floating-caliper disc brake, such as disclosed in British Pat. No. 1,255,079, the floating caliper is guided axially at two guide bolts secured to the brake support member. To displace the floating caliper away from the brake disc in its guide for detachment of the brake shoe which is actuated directly by the floating caliper, the known brake includes elastic rubber rings in the brake support member which embrace frictionally the guide bolts secured to the brake caliper. When the brake is applied, the rubber rings will be deformed elastically so that they tend to shift the floating caliper into its initial position again after the brake is released. However, in practical operation, this construction will not achieve the effect desired. The friction force attainable between the guide bolts and the rubber rings is too small to overcome the resistance in the floating-caliper guide. In addition, the travel of elastic deformation is insufficient to conform to the actuating travel of the floating caliper which varies dependent upon the magnitude of the actuating force. That is to say, employment of this restoring alternative in a floating-caliper disc brake having guide bolts which are fixed to the brake support member as disclosed in German Patent DE-OS No. 2,840,374 would not solve the problem of restoring the brake shoe that is fastened directly to the floating caliper after a braking action.

SUMMARY OF THE INVENTION

It is, therefore, an object of the present invention to provide a spot-type floating-caliper disc brake of the type referred to hereinabove, wherein the brake shoe which is secured directly to the floating caliper is accurately reset to the nominal clearance from the brake disc after each braking operation.

A feature of the present invention is the provision of a spot-type floating-caliper disc brake comprising at least one guide bolt secured to a brake support member and extending from the support member perpendicular to a brake disc into an axial bore of a brake caliper adjacent a side of a brake cylinder disposed in the caliper; a pair of sealing rings each disposed adjacent different ends of the axial bore to provide a pressure chamber surrounding the one guide bolt in communication with a hydaulic brake circuit, at least one of the pair of sealing rings being a roll-back sealing ring to restore the caliper to a nominal brake clearance after a braking operation.

In this arrangement, the sealing ring close to the brake disc may be a roll-back sealing ring which is accommodated in an annular groove in the wall of the axial bore. However, it is likewise possible that the sealing ring remote from the brake disc is a roll-back sealing ring which is accommodated in an annular groove of the guide bolt. However, it is preferred that both sealing rings are roll-back sealing rings.

By arranging the pressure chamber around the guide bolt, there results such a high coefficient of friction between the sealing rings and the guide bolt that restoring of the floating caliper after each braking action is reliably ensured. Moreover, movability of the floating caliper is improved by the lubrication of the axial bore and guide bolt with pressure fluid. To achieve the effect desired, it is necessary that the two roll-back sealing rings are arranged in kinematically reverse order in the manner described to have the same direction of operation. It is another advantage of the inventive construction that the extent of the sealing ring's deformation remains substantially constant after attainment of a limit pressure value so that a specifically adjustable brake clearance can be accomplished independently of the intensity of brake application.

In principle, the present invention may also be utilized in floating-caliper brakes in which the guide bolt is secured to the floating caliper and guided axially slidably in the brake support member. However, a special pressure fluid line will be required in this case to extend from the hydraulic brake circuit to the brake support member.

The release movement of the floating caliper in the inventive brake, which movement is attained by the roll-back sealing rings at the axial bolt, is directed towards the brake disc. Superimposed thereon is the release movement of the brake piston guided in the floating caliper, this movement being directed away from the brake disc. To obtain approximately the same amount of clearance at both brake shoes, in a particularly preferred embodiment, the sealing rings and the annular grooves at the guide bolt and at the brake piston are dimensioned such that the release movement of the brake piston after a braking operation will be about double the amount of the release movement of the floating caliper.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
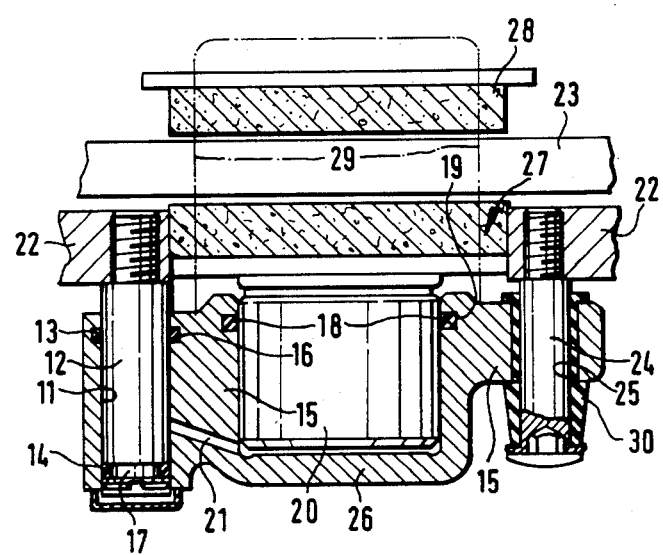
FIG. 1 is a partial cross sectional view of a part of a spot-type floating-caliper disc brake according to the principles of the present invention.

Referring to FIG. 1, two guide bolts 12 and 24 are fastened to a brake support member 22 of a spot-type floating-caliper disc brake provided with a brake disc 23, which guide bolts are spaced from each other in a circumferential direction and extend vertically relative to and away from brake disc 23.

To compensate for manufacturing tolerances, guide bolt 24, being of a somewhat thinner construction than bolt 12, is guided in an elastic bushing 30 which is inserted in an axial bore 25 of the floating caliper 15. The guide bolt 12 is of a somewhat thicker construction than bolt 24 and extends through an axial bore 11 in floating caliper 15. By this arrangement, the circumferential force acting on floating caliper 15 during the braking operation will be received mainly by guide bolt 12, while guide bolt 24 prevents floating caliper 15 from rotating around guide bolt 12. Disposed intermediate the two axial bores 11 and 25 is the brake cylinder 26 which accommodates the brake piston 20 axially slidably therein. Brake piston 20 acts upon a brake shoe 27. The brake shoe 28 which is arranged on the opposite side of brake disc 23 is rigidly connected to the part of the floating caliper that overlaps brake disc 23, which has been indicated in FIG. 1 by dot-dash lines 29 only, since this construction corresponds to the usual structure of a floating-caliper disc brake.

According to the present invention, an annular groove 16 having a roll-back sealing ring 13 inserted therein is disposed at the end of and in the wall of axial bore 11, which end is close to brake disc 23. At the opposite end of axial bore 11, guide bolt 12 includes an annular groove 17 likewise having a roll-back sealing ring 14 inserted in it. The pressure chamber which is thereby enclosed between the two sealing rings 13 and 14 communicates via a line 21 with the cylinder chamber located behind brake piston 20. The latter chamber is connected to the hydraulic brake circuit in the usual manner (not shown).

Figure 2:
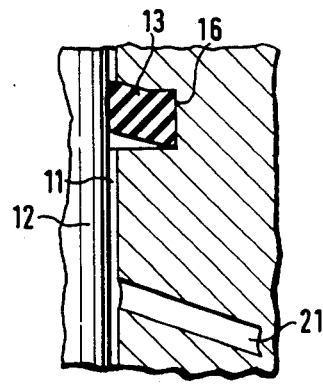
FIG. 2 is an enlarged cross sectional view of FIG. 1 illustrating the effect of a roll-back sealing ring.

Introduction of pressure via line 21 into the pressure chamber enclosing guide bolt 12 results in a deformation of the roll-back sealing rings such as has been illustrated in FIG. 2 with respect to roll-back sealing ring 13. Thus, when guide bolt 12 and floating caliper 15 are displaced relative to one another, roll-back sealing ring 13 will not only be somewhat deformed in a parallelogram-like manner as seen in FIG. 2, but likewise compressed axially resilliently, while the radial pressure of roll-back sealing ring 13 on guide bolt 12 is increased considerably. When the pressure in line 21 decreases after a braking action, roll-back sealing ring 13 expands again and, in doing so, entrains floating caliper 15 in the direction of the disc. Since roll-back sealing ring 14 is inserted in guide bolt 12, it acts in the same direction as roll-back sealing ring 13.

According to FIG. 1, a roll-back sealing ring 18 is likewise arranged in a circumferential groove 19 of brake cylinder 26. However, groove 19 and roll-back sealing ring 18 are constructed in such a way that, after a braking operation, the restoring movement of piston 20 is about double the amount of floating caliper 15 to ensure establishment of like brake shoe clearances on both sides of brake disc 23.

Finally, it should be pointed out that it is important for the roll-back effect of sealing rings 13 and 14 to arrange for a chamfer at the side wall of the sealing ring groove, or of the sealing ring itself, which chamfer lies outside the pressure chamber.

While I have described above the principles of my invention in connection with specific apparatus, it is to be clearly understood that this description is made only by way of example and not as a limitation to the scope of my invention as set forth in the objects thereof and in the accompanying claims.

I claim:

1. A spot-type floating-caliper disc brake comprising:
at least one guide bolt secured to a brake support member and extending from said support member perpendicular to a brake disc through an axial guide bolt bore of a brake caliper adjacent a side of brake cylinder disposed in said caliper, the cylinder being in communication with a hydraulic brake circuit;
a first and a second brake pad on opposed sides of said disc, said first brake pad responsive to movement of a piston in said cylinder to engage said disc and said second pad responsive to said movement of the caliper to engage the disc on initiation of a braking operation;
a pair of sealing rings each disposed adjacent different ends of said axial bore to form a pressure chamber in said axial bore between said sealing rings with said guide bore being in communication with said hydraulic brake circuit to aid in the restoration of the caliper on termination of a braking operation, at least one of said pair of sealing rings being a roll-back seaing ring to restore said caliper to a nominal brake clearance after a braking operation; and a second guide bolt extending between said brake support member and said caliper, and in which said communication from the hydraulic brake circuit comprises a pressure line extending only to the axial bore of the first-mentioned guide bolt to lubricate said first-mentioned guide bolt during a breaking operation.

2. A disc brake according to claim 1, wherein
both of said pair of sealing rings are roll-back sealing rings.

3. A disc brake according to claim 2, in which said hydraulic brake circuit includes a main brake cylinder, said brake further including
an additional roll-back sealing ring disposed in a further annular groove in a wall of said brake cylinder to restore a piston of said brake cylinder to its nominal position after said braking operation,
said roll-back sealing rings and said first and second grooves and said additional roll-back sealing ring and said additional groove being dimensioned such that the restoring movement of said piston is substantially double the amount of the restoring movement of said caliper.

4. A disc brake according to claim 1, wherein
said one of said pair of sealing rings is disposed in a first annular groove disposed in said first-mentioned guide bolt remote from said disc.

5. A disc brake according to claim 4, wherein
the other of said pair of sealing rings is disposed in a second annular groove disposed in a wall of said axial bore adjacent said disc.

6. A disc brake according to claim 5, wherein
both of said pair of sealing rings are roll-back sealing rings.

7. A spot-type floating-caliper disc brake is claimed in claim 1, in which said second guide bolt is spaced from said first-mentioned guide bolt for preventing rotation of said caliper about said first-mentioned guide bolt, and in which both said guide bolts are firmly secured to said support member and are slideably secured to said caliper.

* * * * *